United States Patent
Pliskin

[11] 3,832,886
[45] Sept. 3, 1974

[54] DIE SWELL TESTING
[75] Inventor: Irwin Pliskin, New York, N.Y.
[73] Assignee: Uniroyal, Inc., New York, N.Y.
[22] Filed: June 5, 1972
[21] Appl. No.: 259,982

[52] U.S. Cl. ............................................. 73/56
[51] Int. Cl. ............................................ G01n 11/04
[58] Field of Search .................... 73/56, 55, 15.4

[56] References Cited
UNITED STATES PATENTS

| | | | |
|---|---|---|---|
| 2,780,096 | 2/1957 | Noble et al. | 73/56 X |
| 3,033,021 | 5/1962 | Dickason | 73/56 X |
| 3,071,961 | 1/1963 | Heigl et al. | 73/55 |
| 3,203,225 | 8/1965 | Sieglaff et al. | 73/56 X |
| 3,242,720 | 3/1966 | Zavasnik | 73/56 |
| 3,360,986 | 1/1968 | Rothschild | 73/56 |
| 3,526,126 | 9/1970 | Wilchinsky et al. | 73/56 |

*Primary Examiner*—Richard C. Queisser
*Assistant Examiner*—Joseph W. Roskos
*Attorney, Agent, or Firm*—Norbert P. Holler, Esq.

[57] ABSTRACT

A method and apparatus for instantaneously measuring the die swell of an extrudate is disclosed. A polymeric material such as a rubber or plastic is extruded at a constant volumetric flow rate. The die swell of the material is determined by (a) measuring the time it takes the extrudate to move a given distance almost immediately after leaving the die. In the preferred arrangement, the said distance is made numerically equal to the extrusion velocity, whereby the measured time is the value of the die swell.

4 Claims, 1 Drawing Figure

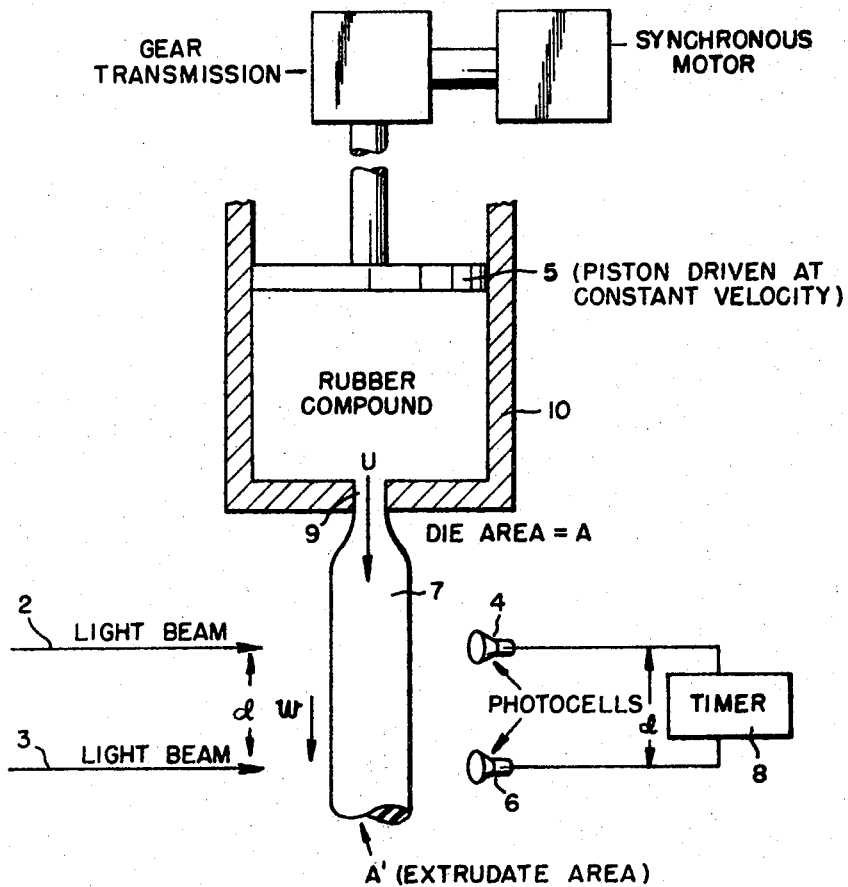

DIE SWELL TESTING

The invention pertains to die swell testing and more particularly to a novel method and apparatus for instantaneously determining the die swell of an extrudate.

BACKGROUND OF THE INVENTION

In the art of measurement of extrusion shrinkage or die swell of polymeric materials it is conventional to employ a capillary rheometer in which the material under test is placed into an extrusion chamber, heated to an equilibrium temperature and then extruded at a predetermined constant rate through a die. The extrudate is allowed to cool to room temperature, cut to a known fixed length, accurately weighed and its density measured. The die swell is then calculated from the following equation (1):

$$S = \frac{\text{Cross-Sectional Area of Extrudate}}{\text{Cross-Sectional Area of Die}} = \frac{A'}{A} \quad (1)$$

The cross-sectional area of the extrudate is calculated from the following equation (2):

$$A' = \frac{\text{Extrudate Weight/Density of Extrudate}}{\text{Extrudate Length}} \quad (2)$$

This method, although accurate, is time consuming, subject to errors in calculation and is unsuitable as a rapid and convenient measurement for quality control of the various processing steps involved in the production of extruded shapes.

Therefore, a need existed for a rapid or instantaneous method of measurement in this area. The present invention was conceived as a means of both automatically and instantaneously measuring die swell of an extrudate.

PRIOR ART

As far as is known, this is the first time die swell has been determined in accordance with the principles relating to the continuity equation for incompressible fluids.

SUMMARY OF THE INVENTION

Die swell testing is the measurement of the increase in cross-sectional area that occurs when viscoelastic materials, ranging from rubber to plastics, are extruded through an orifice or capillary die. Die Swell "S" is therefore calculated by the following formula:

$$S = A'/A$$

where:
$A$ is the cross-sectional area of the die (orifice).
$A'$ is the cross-sectional area of the extrudate.

The operating principle of the invention is based upon the equation of continuity for incompressible fluids. The material to be tested is extruded at constant velocity "$U$" through a circular die having cross-sectional area $A$. As the elastic compound exits from the die, it almost instantaneously swells in cross-sectional area. In achieving the new area $A'$, the velocity of the material decreases from $U$ to "$W$". Since the volumetric flow rate is constant, in accordance with the continuity equation for incompressible fluids, the following is true;

$$AU = A'W$$

The die swell $S$, therefore, can be given as:

$$S = A'/A = U/W$$

The velocity $W$ of the extrudate being a function of the material's elasticity, (or die swell), the die swell can be measured by determining the time $t$ it takes for the extrudate to move a fixed distance $d$, in accordance with the following formula:

$$S = U/W = U/(d/t) = (U/d)t$$
$$= (\text{constant}) \, t$$

The material is initially housed in a cylinder. A piston moving at constant velocity forces the material through a die. When the material exits from the die, the time $t$ it takes the material to move a distance $d$ is measured by an electronic timer. The timer is activated when light beams, aimed at photocells a distance $d$ apart, are blocked by the moving extrudate. Where the cross-sectional area of the extrudate is small, paper tape may be applied to the tip of the extrudate to block the light beams.

By selecting the distance $d$ to have the same numerical value as the velocity $U$, the constant in the last aforementioned equation becomes unity and the die swell becomes numerically equal to the time measurement.

The advantages of this new method are:
a. the measurement of die swell is direct and instantaneous;
b. the die swell measurement is automatically obtained;
c. the need for cutting the extrudate to a precise length and weighing it are eliminated;
d. the need for measuring the density of the material is dispensed with;
e. The need for making calculations with their attendant errors is obviated;
f. The invention is applicable to "on-line" control of extrusion and mixing processes, and is a useful way of maintaining plant quality control.

It is an object of this invention to measure die swell in a material both automatically and instantaneously;
it is another object of the invention to provide a new method and apparatus for measuring die swell in a material;
it is another object of this invention to provide a new method of measuring die swell based upon the continuity equation for incompressible fluids.

These and other objects of this invention will become more apparent and will be better understood with reference to the following detailed description and accompanying drawing, in which the sole FIGURE is a schematic view of the die swell testing apparatus of this invention.

Generally speaking, the invention is a method and apparatus for measuring die swell in an extrudate. The material to be tested is extruded at constant volumetric flow rate. The extrudate velocity, or the time it takes the extrudate to move a given distance is then measured. The die swell is then obtained according to the following formula:

$$S = U/W = U/(d/t) = (\text{constant}) \, t$$

or where $d$ is made numerically equal to $U$; using consistent dimensional units for $d$, $U$ and $t$:

$$S = t$$

wherein:
S is die swell,
U is the extrusion velocity in the die,
W is the velocity of the extrudate,
d is the distance over which the extrudate movement is measured,
t is the time it takes for the extrudate to move a distance d.

Now referring to the drawing, a schematic view of the die swell testing apparatus is shown. Typically, a rubber compound is deposited within cylinder 10. The cylinder has a die or orifice 9 having an area "A" at one end thereof. A piston 5 pushes the compound through the die at a constant velocity U as shown by the arrow. The piston 5 may be driven by means of a synchronous motor acting upon the piston 5 through a jactuator or other gear transmissional device. The capillary rheometer (model 3211) made by the Instron Corporation can be a typical means of forcing the compound through a die at a constant velocity. The compound exits from the die 9 as extrudate 7. The extrudate 7 has a new area A' (due to the die swell), and a velocity W as shown by the arrow.

Two photocells 4 and 6 respectively are placed opposite the line of travel of the extrudate. Photocell 4 is placed in the immediate area of the die exit. Photocell 6 is placed a distance d away from photocell 4.

Two light beams 2 and 3, respectively, are positioned opposite the photocell sensors, also a distance d apart as shown.

When the extrudate 7 moves down from the die 9, a paper tape which has been attached to its tip breaks the light beam 2, causing photocell 4 to trigger the start of electronic timer 8. The need for a paper tape is eliminated when the extrudate's cross-sectional area is made large compared with the cross-sectional area of the light beam. When the extrudate 7 moves past light beam 3, photocell 6 is caused to trigger the electronic timer 8 to stop.

The time it takes the extrudate 7 to move a distance d is thus recorded. Where the numerical value for d is the same as the numerical value for the initial velocity of extrusion in the die U, the reading on the timer 8 will be the instantaneous die swell reading.

The distance between the first sensor and the die exit is quite important. If the first sensor is too near the die, the material will not have enough time to approach its equilibrium die swell. If the sensor is too far from the die, the extrudate will be stretched under its own weight. There is therefore an optimum range of distance for placing the sensors so that the time reading more nearly equals the equilibrium die swell.

Many modifications and changes are possible in the aforementioned scheme. For example, other sensors may be used rather than photocells, such as velocity screens, limit switches, etc.

In the above described apparatus, the velocity in the die is a known constant. However, this method of die swell measurement would also be operative if a known time-varying velocity (a known time-average velocity) is used.

There are numerous other ways for measuring time or velocity within the scope and spirit of this invention, and the invention is not to be limited by the depicted apparatus. The apparatus shown is deemed to be merely exemplary of the invention, which should be interpreted with respect to the appended claims.

I claim:

1. An apparatus for the direct and instantaneous measurement of the die swell S of a visco-elastic material, comprising;
   a. extrusion means including a cylinder having a bore therein for containing a quantity of said material, a die disposed at one end of said bore, a piston slidably disposed in said bore, and a drive unit operatively connected with said piston for selectively moving the same toward said die so as to force said material, when disposed in said bore, out of the latter via said die at a constant velocity U;
   b. first sensor means disposed below said extrusion means and in the immediate vicinity of said die adjacent the path of the extrudate after the latter exits from said die;
   c. second sensor means disposed below and spaced a distance d from said first sensor means adjacent said path of the extrudate, said distance between said first and second sensor means being numerically equal to said velocity; and
   d. timing means operatively connected to said first and second sensor means so as to be triggered into starting upon a specified section of the extrudate moving into the sensing region of said first sensor means, and so as to be triggered into stopping upon said specified section of the extrudate moving into the sensing region of said second sensor means, said timing means thereby serving to measure the time t it takes said specified section of the extrudate to move said distance so that, with die swell being defined by the relation $S = (U/d)t$, the time reading is a direct and instantaneous measurement of the die swell.

2. The apparatus of claim 1, wherein said first and second sensor means comprise light beam and photocell arrangements.

3. The apparatus of claim 1, wherein said timing means comprises an electronic timer.

4. A method of directly and instantaneously measuring the die swell S of a visco-elastic material, comprising the steps of:
   a. extruding said material vertically downwardly through a die at a constant velocity U;
   b. allowing the resultant extrudate to swell freely immediately after exiting from the die;
   c. causing said extrudate to travel vertically in a downward direction so as to have a specified section of the extrudate move sequentially past and thereby activate a first sensor located in the immediate vicinity of the die exit and a second sensor located a distance d below said first sensor;
   d. adjusting said sensors to make said distance d therebetween numerically equal to said velocity U; and
   e. measuring the time interval between activation of said sensors to provide a reading of the time t taken by said specified section of said extrudate to travel said distance d from said first to said second sensor;
   f. whereby with the die swell being defined by the relation $S = (U/d)t$, the time reading is a direct and instantaneous measurement of the die swell.

* * * * *